United States Patent
Rottenberger et al.

(10) Patent No.: US 6,619,446 B2
(45) Date of Patent: Sep. 16, 2003

(54) VIBRATION DAMPER WITH A DEAERATING DEVICE

(75) Inventors: Theo Rottenberger, Burkardroth-Gefäll (DE); Alexander Schwarz, Thüngen (DE); Steffen Gail, Schwebheim (DE); Markus Reinhart, Schweinfurt (DE); Peter Brembs, Röthlein (DE); Stefan Lungwitz, Schweinfurt (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/935,905

(22) Filed: Aug. 23, 2001

(65) Prior Publication Data

US 2002/0036126 A1 Mar. 28, 2002

(30) Foreign Application Priority Data

Aug. 26, 2000 (DE) .......................... 100 42 033

(51) Int. Cl.⁷ .................................................. F16F 9/36
(52) U.S. Cl. .................. 188/322.16; 188/285; 188/315; 188/318
(58) Field of Search ........................ 188/322.19, 322.16, 188/322.15, 322.13, 322.21, 285, 269, 315, 314, 318; 267/64.15

(56) References Cited

U.S. PATENT DOCUMENTS

| 4,139,182 A | * | 2/1979 | Nagase et al. .............. 188/315 |
| 4,287,970 A | | 9/1981 | Eusemann et al. |
| 4,428,566 A | * | 1/1984 | de Baan et al. ............. 188/269 |
| 4,440,273 A | * | 4/1984 | Butler ......................... 188/315 |
| 4,673,068 A | * | 6/1987 | De Bruijn .................... 188/315 |
| 5,901,820 A | * | 5/1999 | Kashiwagi et al. ..... 188/322.13 |
| 6,076,814 A | * | 6/2000 | Grundei ....................... 188/315 |
| 6,092,795 A | * | 7/2000 | McGuire ................ 188/322.21 |

FOREIGN PATENT DOCUMENTS

| DE | 1 847 247 | 2/1962 |
| DE | 29 05 928 | 8/1980 |
| DE | 37 03 618 | 8/1988 |
| DE | 37 25 008 | 2/1989 |
| DE | 42 36 040 | 4/1994 |
| DE | 197 20 994 | 11/1998 |
| DE | 100 00 199 | 8/2000 |
| DE | 199 53 372 | 8/2000 |
| EP | 189 220 | 7/1986 |
| GB | 1 447 229 | 8/1976 |

* cited by examiner

Primary Examiner—Christopher P. Schwartz
Assistant Examiner—Melanie Torres
(74) Attorney, Agent, or Firm—Cohen, Pontani, Lieberman & Pavane

(57) ABSTRACT

A vibration damper, particularly a mono-tube vibration damper, has a cylinder in which a piston rod is arranged together with a piston so as to be axially movable, wherein the piston divides the cylinder into two work spaces filled with a work medium, the vibration damper having at least one deaerating device at the outer surroundings of the vibration damper for the areas filled with the work medium.

4 Claims, 2 Drawing Sheets

VIBRATION DAMPER WITH A DEAERATING DEVICE

BACKGROUND OF THE INVENTION

1. Field of the Invention

The invention is directed to a vibration damper, particularly a mono-tube vibration damper wherein a piston carried on a piston rod is axially moveable in a cylinder, the piston dividing the cylinder into two work spaces filled with a work medium.

2. Description of the Related Art

GB 1 447 229 discloses a vibration damper which has, inside the piston rod guide, a flow connection between two work spaces of the cylinder, wherein an adjustable damping valve is arranged inside the flow connection.

Vibration dampers, especially those with an adjustable damping valve, often have very narrow flow connections in which air bubbles can form. In conventional vibration dampers based on the two-tube principle, an axially movable valve ring which is arranged inside the piston rod guide and allows work medium to flow via the connection duct into a compensation space has been used for a considerable time. In this case, trapped air is removed in the region of the piston rod seal. Reference is had, for example, to DE 29 05 928 A1.

SUMMARY OF THE INVENTION

It is the object of the present invention to provide a vibration damper, especially a mono-tube vibration damper, with at least one adjustable damping valve in which trapped air inside the vibration damper can be minimized.

According to the invention, this object is met in that the vibration damper has at least one deaerating device at the outer surroundings of the vibration damper for the areas filled with the work medium.

The great advantage of the invention consists in that the trapped air can be completely removed from the vibration damper and need not be collected at a suitable location inside the vibration damper.

In order to keep expenditure on construction as low as possible, the deaeration device is formed by a filler cap or screw closure. The air bubbles form mainly during filling, so that the deaerating device is essentially needed only following filling.

According to a feature of the invention, the deaeration device can be actuated independent from an adjustable damping valve.

In order to enhance its effectiveness, the deaeration device is arranged in the area of the highest point of the regions that are filled with the work medium depending on the installation position of the vibration damper.

The deaeration device is preferably arranged inside a piston rod guide.

Further, it is useful when at least one adjustable damping valve is arranged inside a flow connection between the work spaces and the deaeration device is connected to the flow connection. The air bubbles collect precisely in the relatively small cross sections of the flow connection and can then be removed from the vibration damper by a very short path.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
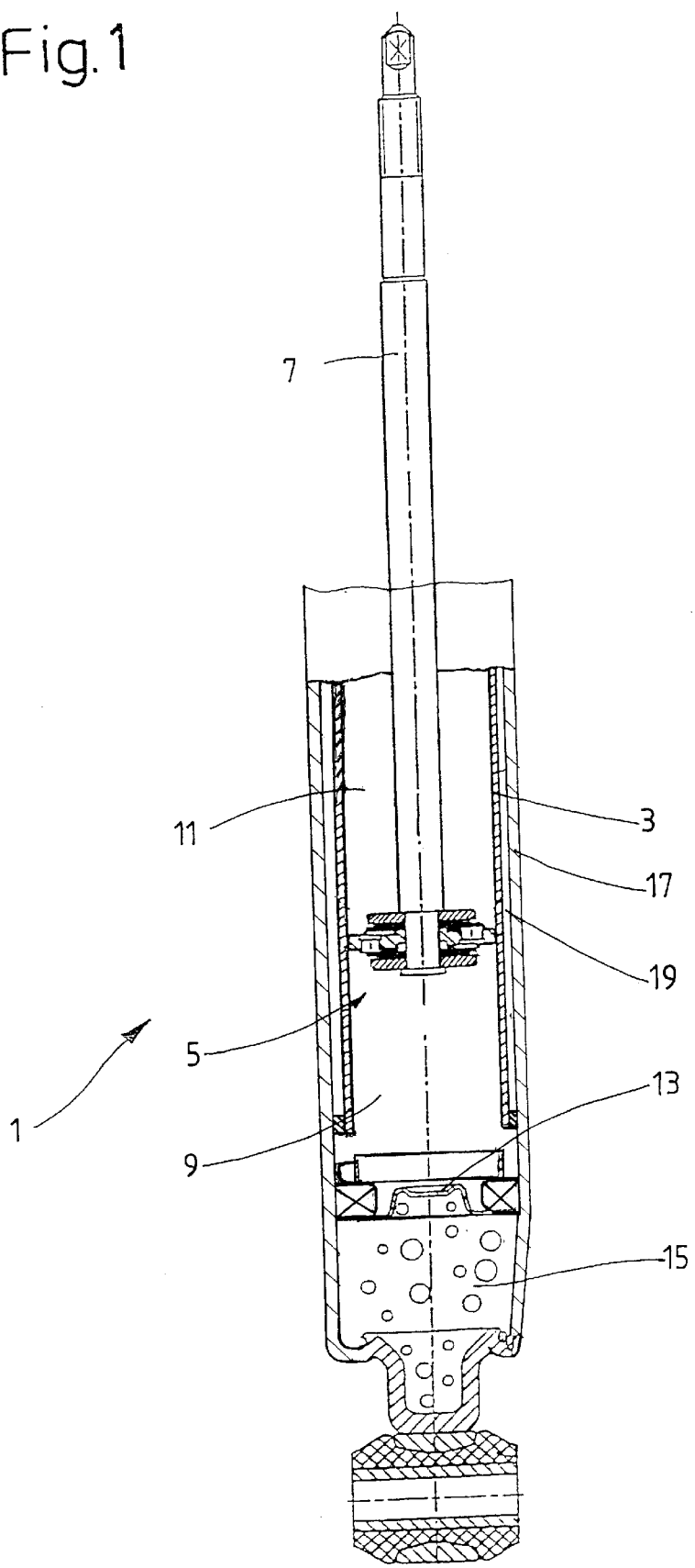
FIG. 1 is a longitudinal sectional view of a vibration damper made in accordance wit the invention.

FIG. 1 shows a mono-tube vibration damper 1 with a cylinder 3 in which a piston 5 is arranged at a piston rod 7 so as to be movable axially. The piston divides the cylinder into a lower and an upper work space 9; 11 which are completely filled with a damping medium. A separating piston 13 prevents the penetration of gas from a compensation space 15 into the lower work space 9.

The piston 5 can be outfitted with damping valves which enable an exchange of damping medium between the work spaces 9; 11. A vessel 17 which forms at least one fluid connection 19 with the cylinder 3 is arranged concentric to the cylinder 3, wherein the fluid connection is connected with the lower work space 9 and, via a piston rod guide 21, (see FIG. 2) with the upper work space 11. There can be a flow in two directions through the fluid connection depending on the piston movement. The fluid connection need not be constructed as an annular space; rather, it can also be formed by one or more axial grooves in the vessel or in the cylinder or, alternatively, can extend outside of the vessel.

Figure 2:
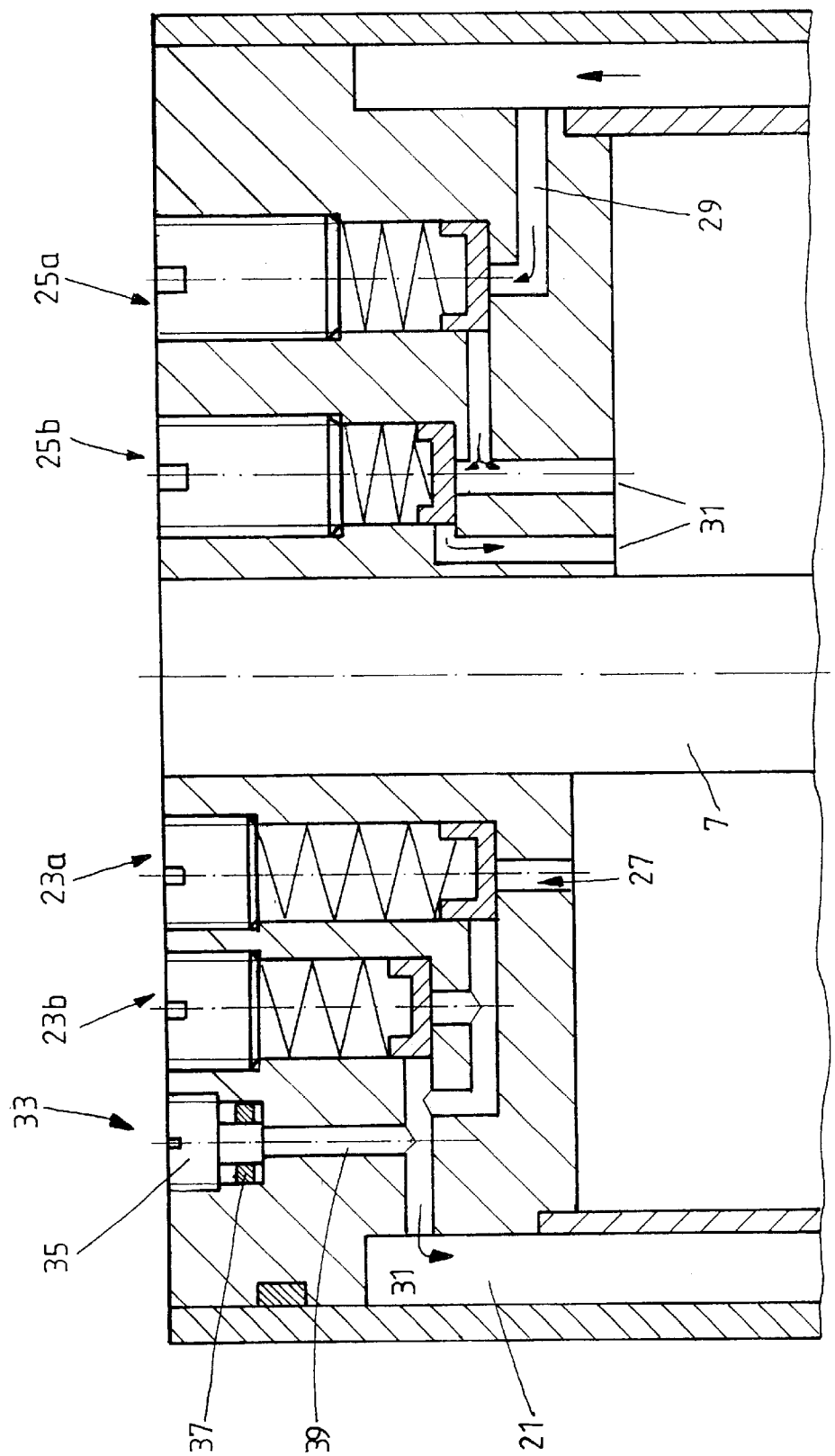
FIG. 2 shows a sectional view of the piston rod guide.

FIG. 2 shows a detailed view of the piston rod guide 21. For each piston movement direction, at least one adjustable damping valve, preferably two damping valves, 23a; 23b; 25a; 25b for each piston rod movement is or are arranged inside the piston rod guide. A first damping valve 23a; 25a is designed for a lower speed range and a second damping valve 23b; 25b is designed for a higher speed range. Reference is had to DE 199 53 372 A1 with respect to the construction and the operation of the two damping valves for both through-flow directions. The contents of this patent application makes up part of the present specification.

The damping medium is supplied to the damping valves 23a; 23b; 25a; 25b via a flow connection 27; 29. The flow connection terminates with its outlet opening 31 inside the fluid connection or in the work space 11. Each of the flow connections can have a flow only in one direction due to the valve design. FIG. 2 shows the damping valves functionally in a series arrangement. In some cases, it is useful to arrange the damping valves in a hydraulically parallel manner in a flow connection. A deaeration device 33 comprising a screw closure 35 and at least one seal 37 is arranged at a location which is as close as possible to the damping valves. A deaeration duct 39 is connected to the flow connection, wherein the open deaeration duct is connected to the outer surroundings of the vibration damper.

FIG. 2 shows only one deaeration device, but each flow connection can have a separate deaeration device.

The deaeration device is chiefly arranged proximal a highest point location of damper work medium of the region filled with the work medium. The highest point location is one that will be established by the installation position or orientation of the damper.

After the assembly and filling of the vibration damper, it cannot be ruled out that air bubbles will form primarily in the region of the damping valves. In order to avoid disassembling the adjusted damping valves 23a; 23b; 25a; 25b, the screw closure can be loosened, so that the air bubbles can escape from the flow connections 27; 29. Subsequently, the deaeration screw is screwed on again. The process can also be repeated a number of times.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper, comprising:
   a cylinder defining a damping area filled with a work medium;
   a piston rod axially moveable in the cylinder;
   a piston carried on the piston rod and dividing said damping area of the cylinder into two work spaces containing the work medium; and
   at least one deaeration device arranged at an outer surrounding region of the damper so as to be in fluid communication with the damping area filled with the work medium and ambient conditions surrounding the vibration damper;
   at least one adjustable damping valve; and
   a flow connection for communicating the work spaces, wherein the adjustable damping valve is arranged inside the flow connection and the deaeration device is connected with the flow connection, and wherein said deaeration device comprises a screw closure.

2. A vibration damper according to claim 1, wherein the deaeration device is actuatable independently of any operation of said adjustable damping valve.

3. A vibration damper, comprising:
   a cylinder defining a damping area filled with a work medium;
   a piston rod axially moveable in the cylinder;
   a piston carried on the piston rod and dividing said damping area of the cylinder into two work spaces containing the work medium; and
   at least one deaeration device arranged at an outer surrounding region of the damper area filled with the work medium, wherein the deaeration device is arranged proximal a highest point location of damper work medium filled regions established with an installation position of the vibration damper.

4. A vibration damper according to claim 3, further comprising a piston rod guide for guiding axial movement of the piston rod, wherein the deaeration device is arranged inside the piston rod guide.

* * * * *